United States Patent Office 3,395,158
Patented July 30, 1968

3,395,158
METHOD OF MAKING VITAMIN E
John Allen Miller, Paisley, Scotland, and Hamish Christopher Swan Wood, Bearsden, Glasgow, Scotland, assignors to Burroughs Wellcome & Co., (U.S.A.) Inc., Tuckahoe, N.Y., a corporation of New York
No Drawing. Filed June 29, 1965, Ser. No. 468,132
Claims priority, application Great Britain, June 29, 1964, 26,818/64; Apr. 9, 1965, 15,089/65
3 Claims. (Cl. 260—345.5)

ABSTRACT OF THE DISCLOSURE

This invention comprises a method of making vitamin E. In particular, this invention comprises the method of making the compound of Formula I

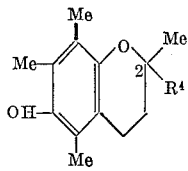

(I)

which comprises reacting a compound of Formula II

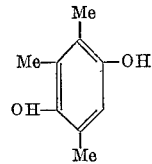

(II)

with a compound of Formula III

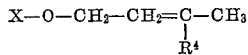

wherein $R^4$ is 4,8,12-trimethyltridecyl and X is selected from the class consisting of

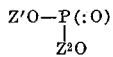

radical, and $Z^3$—$SO_2$— radical, wherein $Z'$ and $Z$ are selected from the class consisting of phenyl and phenyl substituted in the ortho or para position with a group selected from the class consisting of nitro, halogen, sulphuric acid and acetyl, and wherein $Z^3$ is selected from the class consisting of lower hydrocarbon, phenyl, toluyl and either of the above substituted with an electron withdrawing radical.

---

The present invention relates to chroman derivatives, and the manufacture thereof.

It is known that a number of important natural substances belonging to the vitamin E group either have a chroman skeleton of the Formula I in their molecule and are derivatives of 6-hydroxy-2-methyl-chroman, or can be synthesised from intermediates possessing a similarly substituted chroman skeleton.

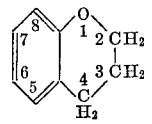

(I)

It has now been found that a number of these substances and intermediates in the form of racemates with respect to C(2), and other homologue or analogue compounds related to them, can advantageously be synthesised by reacting a substituted or unsubstituted dihydric phenol with a phosphate ester or sulphonate ester of a 3-disubstituted allyl radical.

According to the present invention in one aspect there is provided a method for the synthesis of a compound of Formula II,

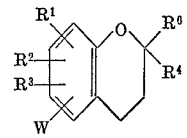

(II)

comprising the step of reacting a compound of Formula III

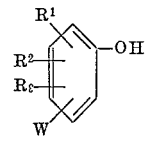

(III)

with a compound of Formula IV,

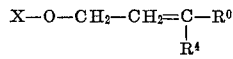

wherein $R^0$ is a lower alkyl group, $R^1$, $R^2$ and $R^3$ are the same or different and each is a hydrogen atom, a lower alkyl group or a lower alkoxy group, W is a hydroxy group, leaving one of the carbon atoms in the ring adjacent to the reacting hydroxy group unsubstituted by any of these groups, $R^4$ is substantially a hydrocarbon chain having from 1 to 50 carbon atoms with up to 10 ethylenic bonds and up to 10 side-chains not exceeding the length of three carbon atoms, and X is either a

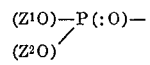

radical, in which $Z^1$ and $Z^2$ are the same or different and each is a phenyl group or a phenyl group substituted in the ortho or para position with an electron withdrawing substituent, such as a nitro, halogen, sulphonic acid or acetyl group, or X is a $Z^3$—$SO_2$— radical, in which $Z^3$ is a lower hydrocarbon, a phenyl group, toluyl group, or either of them appropriately substituted with an electron withdrawing radical. Within the limitation of this definition the exact nature of $Z^1$, $Z^2$ or $Z^3$ is relatively unimportant and irrelevant as these groups are eliminated in the reaction.

In another aspect there are provided new compounds, some of which are homologues and analogues of compounds already known to occur in nature. In a particular aspect there is provided a method, which uses an appropriate 3-disubstituted allyl-p-toluene sulphonate or 3-disubstituted allyl diphenyl phosphate as a reagent.

In a further particular aspect there are provided compounds according to Formula I, in which $R^0$ is a methyl group and W as a hydroxy group is attached to C(6) in the ring system. Some of these 6-hydroxy-chromans represent the racemic form, with respect of C(2), of the naturally occurring compounds of the vitamin E group or of homologues or analogues thereof, others are intermediates from which compounds of the vitamin K or similar homologues and analogues may be produced.

The 2-substituted 2,7-dimethyl - 5 - hydroxy-chromans have the same structure as that tentatively assigned to the acid catalysed rearrangement product of the antibiotic grifolin (Goto et al., Tetrahedron, 1963, 19, 2079).

In the production of substituted 2-methyl-chromans it is preferred to use an appropriate derivative of 3-methylallyldiphenyl phosphate or 3-methylallyl tosylate. These and homologous reagents can, for instance, conveniently be made by methods known per se from the corresponding 3,3-disubstituted allyl alcohols with the appropriately substituted diphenylphosphorochloridates or phenyl or alkylsulphonyl chlorides.

It is advantageous to carry out the reaction at elevated temperatures by heating the reactants together in a solvent-free medium or in the presence of non-polar solvents. In these reactions the liberated acid itself has a catalytic action. After the reaction, the separation and purification of the product may then be carried out according to well known methods, which may for instance include extractions and column chromatography on alumina or silica gel. In case of using a dihydric phenol as a starting material, in which both hydroxy groups are capable of entering into a ring formation with compound (IV), by-products consisting of "dichromans" may contaminate the main product in addition to other impurities. The main product can, however, be separated from these contaminants by the above mentioned purification methods well known in the art for this purpose.

The following examples illustrate the invention:

Example 1

3,3-dimethylallyl alcohol (8.6 g., 0.1 mole) in redistilled and dried pyridine (16 ml., 0.2 mole) were cooled to 0° C. in an oven-dried, round bottomed flask, closed by a drying tube. Diphenylphosphorochloridate (24 ml., 0.11 mole) was then added dropwise over 1 hour at 0° C. to the stirred solution of 3,3-dimethylallyl alcohol. Stirring was continued at 0° C. for a further 2 hours, before adding diethyl ether (50 ml.) and water (50 ml.) to the mixture. After shaking and separating, the aqueous phase was extracted with diethyl ether (50 ml.) and the combined ethereal extracts were then washed successively and as quickly as possible, with N-sulphuric acid (50 ml.), dil. sodium hydrogen carbonate solution, and finally water (50 ml.). After drying at 0° C. over anhydrous magnesium sulphate, and filtering, the ether was evaporated at 40–50° C. (bath) leaving an almost colourless viscous oil, identified as 3,3-dimethylallyldiphenyl phosphate, the yield being 22 g. (70%).

Hydroquinone (2.2 g., 0.02 mole) and 3,3-dimethylallyldiphenyl phosphate (6.4 g., 0.02 mole) were heated in a silvered flask at 100° C. and atmospheric pressure for 18 hours. The reaction tended to overheat at first, and the initial pale yellow colouration changed to dark brown. The mixture was cooled and taken up in diethyl ether (50 ml.). The ethereal solution was washed with a dilute solution of sodium hydrogen carbonate (50 ml.), and was extracted with 5 N sodium hydroxide (50 ml.). The strongly alkaline extract was then acidified with dilute hydrochloric acid and was re-extracted with diethyl ether (50 ml.). The ethereal extract was washed with water, dried over anhydrous magnesium sulphate and evaporated.

The residual phenols (2 g.) were transferred onto a chromatographic column made of alumina (60 g.). Elution with ethyl acetate gave a dark red oil, which solidified on standing. This material was recrystallized twice from petroleum ether (boiling range 40–60° C.), and yielded on sublimation at 1.0 mm. Hg white needles of 2,2-dimethyl-6-hydroxy-chroman (0.6), M.P. 74.5–75° C.

Example 2

2,3,5-trimethyl-hydroquinone (3.04 g., 0.02 mole) and 3,3-dimethylallyldiphenyl phosphate (6.36 g., 0.02 mole) were heated in a silvered flask at 100° C. and atmospheric pressure for 10 hours. The mixture was taken up in diethyl ether (40 ml.) and the ethereal solution was washed with a dilute solution of sodium hydrogen carbonate (40 ml.) and with water (40 ml.), and was dried over anhydrous magnesium sulphate. Evaporation of the diethyl ether yielded 5.7 g. of a viscous red oil, which was dissolved in a minimum amount of diethyl ether, and applied to a chromatographic column made of alumina (180 g.).

With diethyl ether as a solvent, a reddish oil was eluted, and this solidified on standing to give reddish needles. The product was recrystallised from petroleum ether (boiling range 40–60° C.) to give white needles identified as 2,2,5,7,8 - pentamethyl-6-hydroxy-chroman (3.4 g.), M.P. 94.5–95.5° C.

Example 3

Geranyldiphenyl phosphate was produced by a process analogous to that described for 3,3-dimethylallyldiphenyl phosphate in Example 1, the starting material being geraniol (15.3 g., 0.1 mole). The identified product was a colourless oil, 21.2 g. (55%), which tended to decompose on standing.

2,3,5-trimethyl-hydroquinone (3.04 g., 0.02 mole) and geranyldiphenyl phosphate (7.72 g., 0.02 mole) were heated in a silvered flask at 100° C. and atmospheric pressure for 12 hours. The mixture was taken up in diethyl ether (50 ml.) and the ethereal solution was washed and dried in the manner of Example 2.

The residue obtained from the extract was adsorbed onto a column made of alumina (200 g.), and was first eluted with petroleum ether (boiling range 40–60° C.) and then with benzene. The last eluent contained a dark red oil (1.9 g.). This was again adsorbed onto an identical chromatographic column. The elution was carried out with 30% v./v. ethyl acetate in diethyl ether which on evaporation gave a pale yellow viscous oil identified as 2,5,7,8 - tetramethyl-2-(4'-methylpent-3'-enyl)-6-hydroxy-chroman (1.15 g.).

Example 4

Phytyldiphenyl phosphate was produced by a process analogous to that described for 3,3-dimethylallyldiphenyl phosphate in Example 1, the starting material being phytol (29.6 g., 0.1 mole). In the extraction much more ether had to be used (2×250 ml.). The identified product was a viscous oil, and the yield was 4.75 g.

2,3,5-trimethyl-hydroquinone (0.76 g., 0.005 mole) and phytyldiphenyl phosphate (2.64 g., 0.005 mole) were heated in a silvered flask at 100° C. and atmospheric pressure for 8 hours. The mixture was diluted with diethyl ether (25 ml.), washed with a dilute solution of sodium hydrogen carbonate (25 ml.) and with water (25 ml.), and the solution was dried over anhydrous magnesium sulphate.

The ethereal solution was evaporated and the residue was chromatographed on a column made of silica gel (200 g.). The elution was carried out with petroleum ether (boiling range 40–60° C.) and then with benzene. The benzene eluent contained a reddish brown oil, which was re-chromatographed on a column made of alumina (60 g.). The elution was carried out with 10% v./v. diethyl ether in benzene, which yielded a pale yellow oil identified as 2,5,7,8-tetramethyl-2-(4',8',12' - trimethyltridecyl)-6-hydroxy-chroman (α-tocopherol) (1.85 g.).

Example 5

3,3 - dimethylallyl alcohol (3.44 g., 0.04 mole) and p-toluenesulphonyl chloride (7.8 g., 0.04 mole) were stirred at 0° C., while pyridine (6.5 ml., 0.08 mole) was added dropwise over 1½ hours. The mixture was stirred for a further 30 minutes before taking up in diethyl ether (100 ml.) and extracting successively with 2 N-hydrochloric acid (50 ml.), 2 N-sodium hydroxide (50 ml.) and water (100 ml.). After drying over anhydrous magnesium sulphate, the ethereal solution was evaporated, yielding a colourless oil, identified as 3,3-dimethylallyl-p-toluenesulphonate (3.11 g., 32%).

$\psi$-Cumenol (1.97 g., 1.29×10$^{-2}$ mole) and 3,3-dimethylallyl - p - toluenesulphonate (3.11 g., 1.29×10$^{-2}$ mole) were heated together for 18 hours at 100° C. in a sealed flask, producing a dark-red tar. This was then applied directly to an alumina chromatography column (150 g.) and eluted with dry diethyl ether. The first eluent was a yellow oil (0.975 g.) from which a white solid precipitated on addition of petrol (B.P. 40–60° C.). This solid was recrystallised from ether, and was identified as the 6-p-toluenesulphonate of 2,2,5,7,8-pentamethyl-6-hydroxychroman (190 mg., 4%), M.P. 157–158° C., by comparison with an authentic sample. The yellow oil was found to be mainly the unchanged tosylate of 3,3-dimethylallyl alcohol.

The second eluent fraction contained a red-orange solid, M.P. 87–93° C., which was recrystallised from petrol (B.P. 40–60° C.) and was found to be 2,2,5,7,8-pentamethyl - 6 - hydroxychroman (1.76 g., 63%), M.P. 91–94° C.

Example 6

Orcinol hydrate (1.31 g., $9.2 \times 10^{-3}$ mole) and farnesyl diphenyl phosphate (4.10 g., $9.2 \times 10^{-3}$ mole) were mixed at room temperature. A darkening was observed immediately, and after 5 minutes sufficient heat had been liberated to melt the orcinol monohydrate (M.P. 57° C.) and evaporate most of the water. The mixture was then heated at 80° C. for 12 hours, after which it appeared as a dark red oil, which showed six spots on a thin layer chromatogram (alumina-diethyl ether). This oil (4.8 g.) was taken up in diethyl ether and extracted successively with N-sodium hydrogen carbonate (50 ml.), 2 N-sodium hydroxide (50 ml.), and water, dried over anhydrous magnesium sulphate and the ether evaporated before chromatography on alumina (140 g.). The first eluent was petrol (B.P. 40–60° C.) and the material recovered from this first eluent (2.16 g., 44%) had the infrared characteristics of dichromans. subsequently, on elution with ether increased from 50 to 100% in benzene as solvent, a slightly discoloured oil was obtained (0.70 g.), which was rechromatographed on alumina with 10% ether in benzene and found to be the mono-chromanol 2,7-dimethyl-2-(4',8'-dimethyl-non-3',7'-dienyl)-5-hydroxy-chroman (0.54 g., 18%).

With ethyl acetate increased from 50 to 100% in ether as solvent, another discoloured oil was obtained (1.20 g.). This oil was rechromatographed on alumina (35 g.) with 50% ether in benzene as an eluent, and was found to be the chromanol 2,5-dimethyl-2-(4',8'-dimethyl - non - 3',7'-dienyl)-7-hydroxy-chroman (0.7 g., 23%).

Example 7

Di-p-nitrophenyl phosphate (4 g., $1.18 \times 10^{-2}$ mole) was suspended at 0° C. in dry chloroform (10 ml.), and the mixture stirred in a flask protected by a drying tube. Phosphorus pentachloride (2.8 g., $1.6 \times 10^{-2}$ mole) was added in one batch and the mixture stirred until most of the solid had disappeared (2½ hours). Petrol (30 ml., boiling range 60–80° C.) was then added and the mixture scratched until crystals began to appear on the sides of the flask. The crystals were filtered, recrystallized by adding petrol (boiling range 60–80° C.) to a hot chloroform solution, and identified as di-p-nitrophenyl phosphorochloridate (3.6 g., 85%), M.P. 96–97° C. [lit. 97° C.].

Di - p - nitrophenyl phosphorochloridate (7.2 g., 0.02 mole) was ground thoroughly and added to a mixture of 3,3-dimethylallyl alcohol (1.72 g., 0.02 mole) in anhydrous diethyl ether (10 ml.). Considerable heat was evolved and the mixture was cooled in an ice-bath to 0° C. Pyridine (dried and redistilled, 3.2 ml., 0.04 mole) was added dropwise at 0° C. over 30 minutes while the solution was stirred, and stirring was continued for 90 minutes. The mixture was treated with diethyl ether (50 ml.) and washed with 2 N-sulphuric acid, N-sodium bicarbonate and water before drying and evaporating the ether. The product was a viscous, pale-yellow oil (1.3 g.; 16%), identified at 3,3-dimethylallyl - di - 4' - nitro-phenyl phosphate, which was used immediately in the subsequent reaction.

3,3-dimethylallyl-di-4-'-nitro-phenyl phosphate (3.3 g., 0.008 mole) and the quinol (1.21 g., 0.008 mole) were heated together at 80° C. for 6 hours in a sealed flask, until the mixture had become a homogeneous red tar. The tar was then chromatographed directly on alumina (140 g.) with diethyl ether solvent. The first fractions were colourless hydrocarbons (traces), but the next fraction was a yellow oil (0.8 g.) which was found to be a complex mixture by thin layer chromatography using petrol-diethyl ether (1:1) as solvent, and which had strong absorption in the carbonyl region of the infrared.

After these fractions the column was eluted with ether-ethyl acetate (4:1) solvent from which 2,2,5,7,8-pentamethyl-6-hydroxychroman (1.76 g., 50%), M.P. 90–93° C. (recryst. from petrol) was separated.

What we claim is:

1. The method of making α-tocopherol, which comprises reacting 2,3,5-trimethylhydroquinone and phytyldiphenyl phosphate.

2. A method of making a compound of Formula I

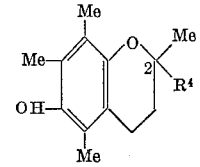

(I)

which comprises reacting a compound of Formula II

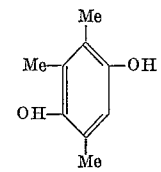

(II)

with a compound of Formula III

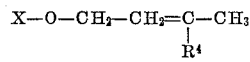

wherein $R^4$ is 4,8,12-trimethyltridecyl and X is selected from the class consisting of

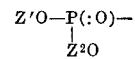

and $Z^3$—$SO_2$— wherein $Z'$ and $Z$ are selected from the class consisting of phenyl and phenyl substituted in the ortho or para position with a group selected from the class consisting of nitro, halogen, sulphuric acid and acetyl, and wherein $Z^3$ is selected from the class consisting of lower hydrocarbon, phenyl, toluyl and either of the above substituted with an electron withdrawing radical.

3. A method according to claim 2, in which $Z^3$ is selected from the class consisting of lower hydrocarbon, phenyl and toluyl.

References Cited

UNITED STATES PATENTS 3,026,330   3/1962   Folkers et al. _____ 260—345.5
3,064,012   11/1962  Folkers et al. _____ 260—345.5

JOHN D. RANDOLPH, *Primary Examiner.*

J. M. FORD, *Assistant Examiner.*